Sept. 4, 1928.
E. GRUENFELDT
1,682,960
FISH PLATE FOR RAILWAY RAILS
Original Filed May 15, 1922
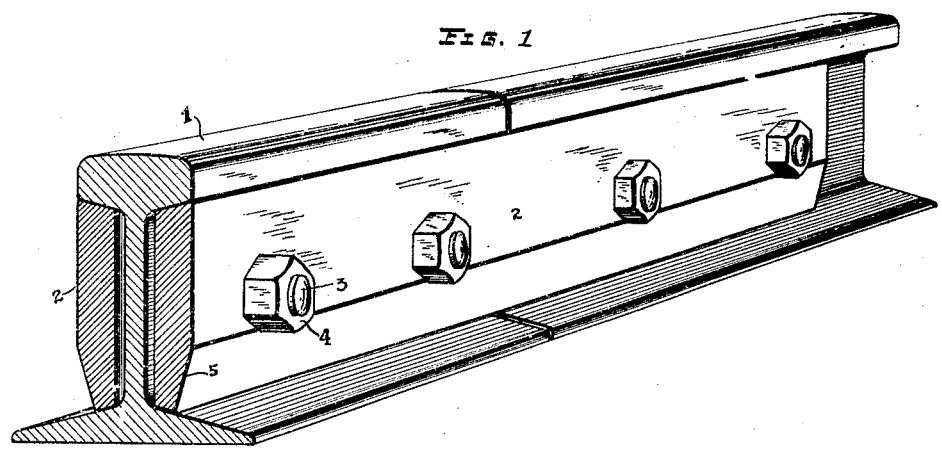
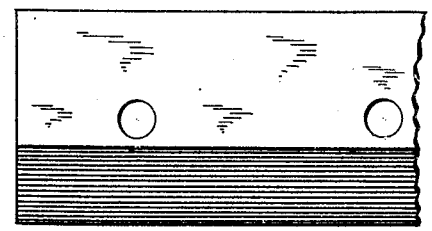
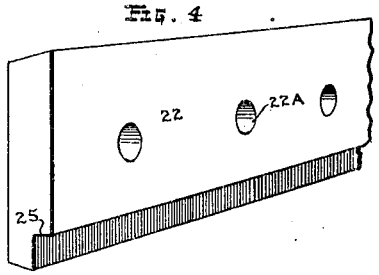
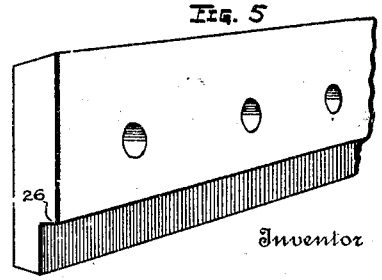
Inventor
Emil Gruenfeldt
By B. D. Watts
Attorney Patented Sept. 4, 1928.

1,682,960

UNITED STATES PATENT OFFICE.

EMIL GRUENFELDT, OF CLEVELAND, OHIO, ASSIGNOR TO THE RAIL WELDING AND BONDING COMPANY, OF CLEVELAND, OHIO, A CORPORATION OF OHIO.

FISHPLATE FOR RAILWAY RAILS.

Application filed May 15, 1922, Serial No. 560,969. Renewed February 2, 1928.

My invention relates to fish plates for railway rails and has as its chief objects to provide fish plates suitably shaped at the base thereof to facilitate welding of the plates to the rail bases, and at the same time to locate the welding seam in a relatively thick portion of the rail base, whereby increased strength and rigidity characteristic of such location are obtained.

In the drawings attached hereto and forming a part of this specification:—

Fig. 1 is a view in perspective of two meeting rail ends assembled with one form of fish plates constructed in accordance with my invention.

Figs. 2 and 3 are respectively cross sectional and side elevational views of a preferred form of fish plate.

Figs. 4 and 5 illustrate, in perspective, modified forms of fish plates.

In attaining the objects of my invention, I employ a fish plate with the outer surface thereof relieved or cut away adjacent the lower edge, or the part which is adjacent the rail base when in assembled relation with the rail. Preferably, I bevel off this outer surface of the fish plate, as is shown in Figs. 1 to 3 inclusive, but I may also form substantially right angled recesses as is shown in Figs. 4 and 5.

In Figs. 1, 2, and 3, numeral 1 designates the rails to be joined, upon opposite sides of which, fish plates 2, are secured by bolts 3, and nuts 4, preparatory to welding. The outer surface of the plates 2, adjacent the rail base is beveled as at 5, whereby the outer edge of the plates which is in contact with the rail base, lies above a relatively thick part of the rail base and closer to the web of the rail than would be the case if the plates were not in this manner cut away.

In Fig. 4 22 indicates a fragment of a fish plate having holes 22ª, for bolts to pass through, and having its lower outer edge formed with a substantially right angled recess 25. The plate shown in Fig. 5 is similar in all respects to that shown in Fig. 4 except that more metal is removed from the lower outer edge of the plate, resulting in a substantially right angled recess 26, with the upper wall located further away from the rail base than in the modification shown in Fig. 4.

It will be observed that the angle formed by the top of the rail base and the outer relieved or cut away surface of the fish plate is not less than about 90°. This angle may vary somewhat from this particular angle but for general practice I believe the best results will be obtained when the angle lies within the limits of about 65° and about 105°.

It will be observed that the opposite side surfaces of the plates are substantially plane and parallel except at the lower outer edge where a portion is cut away as indicated at 5, 25 or 26; and that when assembled between the rail head and rail base the outer surface is substantially flush with the outer surface of the rail head and thus out of contact with the flanges of the car wheels regardless of the thickness of the head of the rail.

Having thus described embodiments of my invention, what I desire to secure by Letters Patent, is defined in what is claimed, it being understood that various changes in dimensions and construction may be made from those shown and described herein without departing from the spirit of the invention or the scope of the claims.

What is claimed is:—

1. A fish plate for a welded rail joint, having side surfaces which are substantially plane and parallel throughout their length and width, the outer surface being cut away at the lower edge for the full length thereof.

2. A fish plate for a welded rail joint, having side surfaces which are substantially plane and parallel throughout their length and width, the outer surface being cut away at the lower edge for the full length thereof and the plate being adapted to be disposed between the head and base of a railway rail with the outer surface of the plate substantially flush with the outer side of the head of the rail.

3. A fish plate for a welded rail joint having side surfaces which are substantially plane and parallel throughout their entire length and width, the base edge of the plate being of a uniform lesser thickness than the top edge of the plate throughout the entire edge of the plate.

4. A splice plate for a rail joint having upper and lower surfaces adapted to bear against the heads and bases respectively of abutting rail ends and to be thereby positioned substantially parallel to and spaced from the webs of the rails, said plate being formed with a portion of its lower outer edge displaced inwardly relatively to its upper outer edge.

In testimony whereof, I hereunto affix my signature.

EMIL GRUENFELDT.